US008922795B2

(12) United States Patent
Miller et al.

(10) Patent No.: US 8,922,795 B2
(45) Date of Patent: Dec. 30, 2014

(54) ENABLING ACCESS TO SUPPORTED CAPABILITIES OF PRINTERS PRIOR TO INSTALLING PRINTER-SPECIFIC SOFTWARE FOR THE PRINTERS (75) Inventors: Howard A. Miller, Saratoga, CA (US); Mohammad R. Gharahgouzloo, San Jose, CA (US); Baskaran Subramaniam, San Jose, CA (US)

(73) Assignee: Apple Inc., Cupertino, CA (US)

( * ) Notice: Subject to any disclaimer, the term of this patent is extended or adjusted under 35 U.S.C. 154(b) by 166 days.

(21) Appl. No.: 13/490,301

(22) Filed: Jun. 6, 2012

(65) Prior Publication Data

US 2013/0201504 A1 Aug. 8, 2013

Related U.S. Application Data (60) Provisional application No. 61/594,963, filed on Feb. 3, 2012.

(51) Int. Cl.
G06F 3/12 (2006.01)
(52) U.S. Cl.
USPC ......... 358/1.13; 358/1.1; 358/1.14; 358/1.15; 358/1.16; 358/1.9
(58) Field of Classification Search
CPC ..... G06F 3/1232; G06F 3/126; G06F 3/1226; G06F 3/1225; G06F 3/1228; H04N 1/00503
USPC .................................. 358/1.13–1.16, 1.1, 1.9
See application file for complete search history.

(56) References Cited

U.S. PATENT DOCUMENTS

| 6,967,728 | B1 * | 11/2005 | Vidyanand | 358/1.12 |
| 7,106,472 | B2 * | 9/2006 | Gomez et al. | 358/1.15 |
| 7,701,605 | B2 * | 4/2010 | Miyata | 358/1.15 |
| 7,903,267 | B2 * | 3/2011 | Yasui et al. | 358/1.13 |
| 8,610,928 | B2 * | 12/2013 | Sweet et al. | 358/1.15 |
| 8,773,675 | B2 * | 7/2014 | Xiao | 358/1.13 |
| 2002/0067498 | A1 * | 6/2002 | Chapman | 358/1.13 |
| 2003/0184782 | A1 * | 10/2003 | Perkins et al. | 358/1.13 |
| 2003/0210424 | A1 * | 11/2003 | Sandfort et al. | 358/1.15 |
| 2004/0085572 | A1 * | 5/2004 | Gomez | 358/1.15 |
| 2004/0218201 | A1 * | 11/2004 | Lermant et al. | 358/1.13 |
| 2005/0046886 | A1 * | 3/2005 | Ferlitsch | 358/1.13 |

(Continued)

FOREIGN PATENT DOCUMENTS

GB 2477610 A 10/2011

*Primary Examiner* — Dennis Dicker
(74) *Attorney, Agent, or Firm* — Park, Vaughan, Fleming & Dowler LLP; Chia-Hsin Suen (57) ABSTRACT

The disclosed embodiments provide a system that facilitates use of a printer. During operation, the system obtains, on an electronic device, a set of supported capabilities from the printer. Next, the system provides, to a user of the electronic device, the set of supported capabilities within a workflow for using the printer without installing printer-specific software for the printer. Upon detecting a selection of a supported capability from the provided set of supported capabilities by the user, the system determines if the supported capability requires the printer-specific software. If the supported capability does not require the printer-specific software, the system enables use of the supported capability by the user without using the printer-specific software to provide the supported capability to the user. If the supported capability requires the printer-specific software, the system uses the printer-specific software to provide the supported capability to the user.

24 Claims, 4 Drawing Sheets

(56) References Cited

U.S. PATENT DOCUMENTS

| | | |
|---|---|---|
| 2006/0203257 A1* | 9/2006 | McLuckie et al. ............ 358/1.1 |
| 2007/0177192 A1* | 8/2007 | Wang ........................... 358/1.15 |
| 2009/0168091 A1* | 7/2009 | Fu et al. ....................... 358/1.15 |
| 2010/0195143 A1* | 8/2010 | Kanemitsu ................... 358/1.15 |
| 2011/0222099 A1* | 9/2011 | Mori ............................ 358/1.14 |
| 2011/0261396 A1 | 10/2011 | Takahashi |
| 2012/0281251 A1* | 11/2012 | Salgado et al. .............. 358/1.15 |

* cited by examiner

ENABLING ACCESS TO SUPPORTED CAPABILITIES OF PRINTERS PRIOR TO INSTALLING PRINTER-SPECIFIC SOFTWARE FOR THE PRINTERS

RELATED APPLICATION

This application claims the benefit of U.S. Provisional Application No. 61/594,963, entitled "Driver Downloading to Support Non-Print Functions in a Multifunction Printer," by inventors Howard A. Miller, Moe Gharahgouzloo and Baskaran Subramaniam and filed 3 Feb. 2012.

The subject matter of this application is related to the subject matter in a co-pending non-provisional application by inventors Michael R. Sweet and Howard Miller and filed 14 Sep. 2010, entitled "Framework that Supports Driverless Printing," having Ser. No. 12/882,116.

BACKGROUND

1. Field

The disclosed embodiments relate to printers for computer systems. More specifically, the disclosed embodiments relate to techniques for enabling access to supported capabilities of printers prior to installing printer-specific software for the printers.

2. Related Art

Printers are often a problem for computer users. When a computer user initially installs a printer, the cabling and power cords are typically relatively straightforward to hook up. However, the user also has to install a printer-specific driver, which involves loading the driver from a disk and/or navigating to a website and downloading the driver. Even if the printer driver is already loaded into the computer system, the user may have to load and install an update for the driver from the printer manufacturer's website. Such installation operations are time-consuming and commonly require the user to find and enter a long software-license key.

Printers pose an even bigger problem for users of portable electronic devices, such as laptop computers, tablet computers, portable media players, or smartphones. Such portable electronic devices are seldom configured with the requisite printer driver software. In addition, installing the appropriate printer driver can be bothersome, especially if the user of the portable electronic device only intends to use the nearby printer once or twice. Portable electronic devices may also have limited storage space, which makes it impractical for them to store a large number of printer drivers.

To mitigate problems associated with installing printers and/or printer drivers, a portable electronic device may include a "driverless" printing system that enables use of compatible printers without downloading, installing, and/or using printer drivers for the printers. For example, the driverless printing system may automatically obtain printer capability information from a printer that is compatible with the driverless printing system. The driverless printing system may also use the capability information to generate a print job and send the print job to the printer without installing a printer driver for the printer.

The driverless printing system may thus reduce the overhead associated with performing print jobs using a variety of printers and/or printer capabilities. On the other hand, the driverless printing system may lack the ability to accommodate other capabilities and/or features of the printers, such as scanning and/or faxing capabilities. Consequently, the user may be unable to use the other capabilities and/or features without manually downloading and installing printer drivers for the printers.

SUMMARY

The disclosed embodiments provide a system that facilitates use of a printer. During operation, the system obtains, on an electronic device, a set of supported capabilities from the printer. Next, the system provides, to a user of the electronic device, the set of supported capabilities within a workflow for using the printer without installing printer-specific software for the printer. Upon detecting a selection of a supported capability from the provided set of supported capabilities by the user, the system determines if the supported capability requires the printer-specific software. If the supported capability does not require the printer-specific software, the system enables use of the supported capability by the user without using the printer-specific software to provide the supported capability to the user. If the supported capability requires the printer-specific software, the system uses the printer-specific software to provide the supported capability to the user.

In some embodiments, the set of supported capabilities includes at least one of a printing capability, a scanning capability, a faxing capability, and a card-reading capability.

In some embodiments, a discovery protocol is used to obtain the set of supported capabilities from the printer.

In some embodiments, providing, to the user of the electronic device, the set of supported capabilities within the workflow for using the printer involves displaying the printer and the set of supported capabilities to the user, and enabling selection of the supported capabilities for use by the user.

In some embodiments, determining if the supported capability requires the printer-specific software involves:
 (i) obtaining a set of driverless capabilities from the electronic device;
 (ii) if the set of driverless capabilities includes the supported capability, identifying the supported capability as not requiring the printer-specific software; and
 (iii) if the set of driverless capabilities does not include the supported capability, identifying the supported capability as requiring the printer-specific software.

In some embodiments, using the printer-specific software to provide the supported capability to the user involves:
 (i) downloading the printer-specific software;
 (ii) installing the printer-specific software on the electronic device; and
 (iii) resuming the workflow for using the printer after the printer-specific software is installed.

In some embodiments, the printer-specific software is downloaded using at least one of a background process and the workflow.

In some embodiments, enabling use of the supported capability by the user without using the printer-specific software to provide the supported capability to the user involves using the workflow to configure use of the supported capability by the user, and accessing the supported capability from the electronic device without using the printer-specific software.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
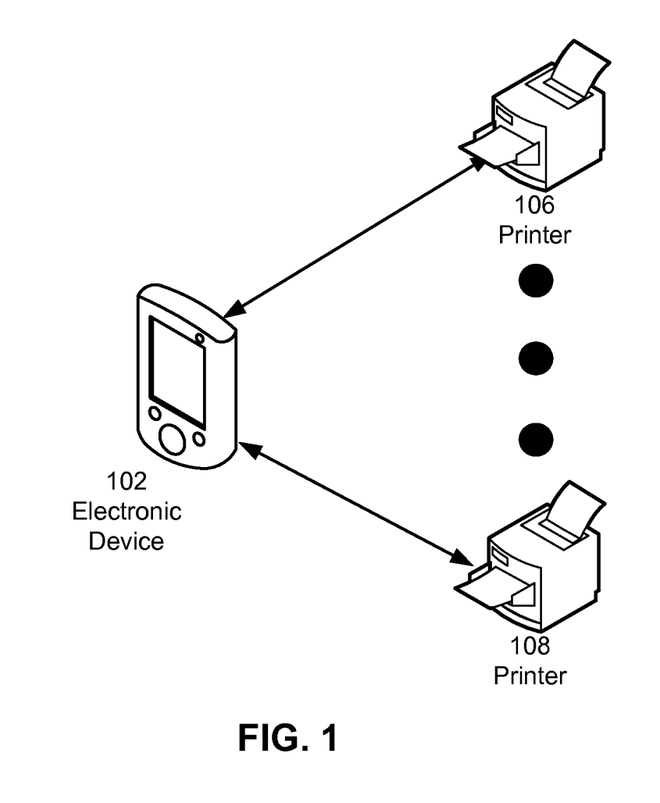
FIG. 1 shows a printing system in accordance with the disclosed embodiments.

The disclosed embodiments provide a method and system for facilitating use of a printer. As shown in FIG. 1, a electronic device 102 includes functionality to communicate with a set of printers 106-108. Electronic device 102 may correspond to a mobile phone, personal computer, laptop computer, tablet computer, personal digital assistant (PDA), portable media player, and/or other type of network-enabled electronic device. Printers 106-108 may correspond to network printers that are capable of wired and/or wireless communications. Alternatively, one or more printers may connect to a print server as local peripherals using one or more printer cables and/or one or more ports (e.g., parallel ports, serial ports, Universal Serial Bus (USB) ports).

Electronic device 102 may interact with printers 106-108 through one or more networks. Such networks may include any type of communication channel capable of coupling together network nodes. For example, the network(s) may include a wireless network connection, such as a Bluetooth (Bluetooth™ is a registered trademark of Bluetooth SIG, Inc.) network connection; a cellular networking connection (e.g., a 3G/4G network or an Edge network); a networking connection based on the standards described in Institute for Electrical and Electronic Engineers (IEEE) 802.11; a wireless personal-area networking (PAN) connection, such as a network connection based on the standards described in IEEE 802.15; or any peer-to-peer (wireless or wired) networking technology.

Figure 2:
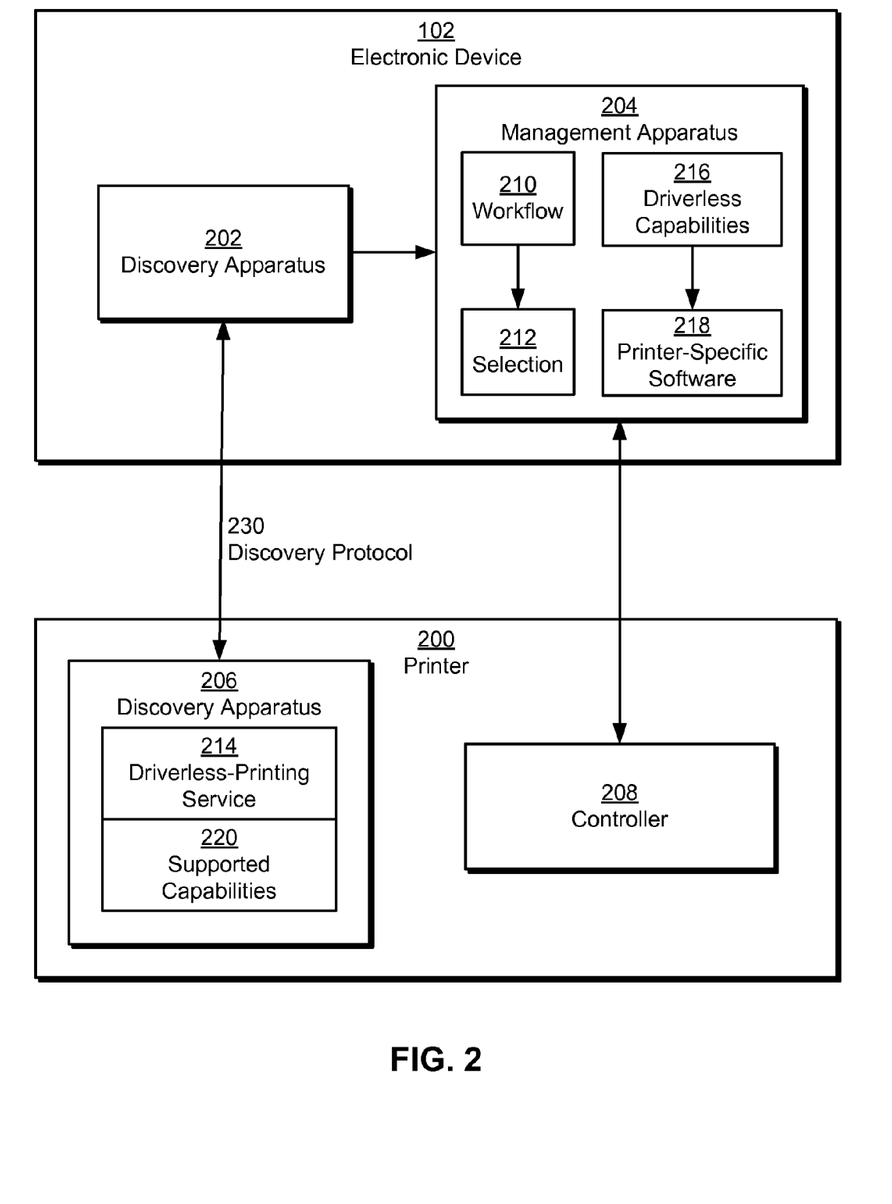
FIG. 2 shows a system for facilitating use of a printer in accordance with the disclosed embodiments.

In one or more embodiments, the printing system of FIG. 1 includes functionality to perform "driverless printing," in which a user of electronic device 102 may print to a nearby printer (e.g., printers 106-108) without installing and/or updating associated printer driver software. As shown in FIG. 2, a discovery apparatus 202 in electronic device 102 may discover (e.g., detect) a nearby printer 200 for use in performing a print job using a discovery protocol 230 such as Bonjour (Bonjour™ is a registered trademark of Apple Inc.).

To enable detection of printer 200 by electronic device 102, a corresponding discovery apparatus 206 on printer 200 may advertise a driverless-printing service 214 on discovery protocol 230. For example, discovery apparatus 206 may advertise driverless-printing service 214 on Bonjour by publishing a specific service type and subtype.

Once printer 200 is selected for performing the print job (e.g., by a user of electronic device 102), a management apparatus 204 on electronic device 102 may obtain the print job from an application on electronic device 102 and transmit the print job to printer 200 over a network connection with printer 200. A controller 208 (e.g., print controller) in printer 200 may then place the print job into a print queue and execute the print job after print jobs preceding the print job in the print queue have been completed and/or cancelled. Driverless printing for electronic devices is discussed in further detail in a co-pending non-provisional application by inventors Michael R. Sweet and Howard Miller and filed 14 Sep. 2010, entitled "Framework that Supports Driverless Printing," having Ser. No. 12/882,116, which is incorporated herein by reference.

On the other hand, the driverless printing system may not be configured for use with all features and/or supported capabilities 220 on printer 200. For example, the driverless printing system may be used to perform print jobs using a variety of printers and/or printer capabilities (e.g., media sizes, media types, ink sets, print qualities, resolution, color spaces, etc.) but may not be used to perform scanning and/or faxing on multifunction printers. As a result, the user of electronic device 102 may forgo use of features and/or capabilities not supported by the driverless printing system, or the user may enable use of all features and/or capabilities on printer 200 by manually downloading and/or installing a printer driver for printer 200, which may be tedious and/or time-consuming.

In one or more embodiments, the system of FIG. 2 includes functionality to enable use of all supported capabilities 220 on printer 200 without requiring the user to manually download and/or install the printer driver and/or other printer-specific software 218 for printer 200. First, discovery apparatus 202 may obtain supported capabilities 220 from printer 200. For example, discovery apparatus 202 may query discovery apparatus 206 for one or more Bonjour TXT records, Internet Printing Protocol (IPP) attributes, and/or Universal Serial Bus (USB) attributes associated with driverless-printing service 214. Discovery apparatus 202 may then search the TXT records, IPP attributes, and/or USB attributes for supported capabilities 220.

Next, management apparatus 204 may provide supported capabilities 220 to the user within a workflow 210 for using printer 200 without installing printer-specific software 218 (e.g., printer driver, software utilities, etc.) for printer 200. For example, management apparatus 204 may guide the user through workflow 210 using one or more screens of a user interface (e.g., graphical user interface) on electronic device 102. To provide supported capabilities 220 to the user, management apparatus 204 may display printer 200 and supported capabilities 220 within the user interface and enable selection of the supported capabilities for use by the user within the user interface. For example, management apparatus 204 may display a printing capability, a scanning capability, a faxing capability, and/or a card-reading capability (e.g., using one or more memory card slots) for printer 200 within a list, table, drop-down menu, set of graphics, and/or other user-interface elements of the user interface to the user. The user may initiate use of one of the displayed capabilities by selecting the capability using a cursor, touch-sensitive device, and/or other input mechanism on electronic device 102.

Management apparatus 204 may detect the user's selection 212 of a supported capability from supported capabilities 220 and determine if the selected supported capability requires printer-specific software 218. As shown in FIG. 2, management apparatus 204 may obtain a set of driverless capabilities 216 from electronic device 102. For example, management apparatus 204 may query an operating system kernel of electronic device 102 for driverless capabilities 216 associated with the driverless printing system. If driverless capabilities 216 include the supported capability, management apparatus 204 may identify the supported capability as not requiring printer-specific software 218. On the other hand, if driverless capabilities 216 do not include the supported capability, management apparatus 204 may identify the supported capability as requiring printer-specific software 218.

If the supported capability does not require printer-specific software 218, management apparatus 204 may enable use of the supported capability by the user without using printer-specific software 218 to provide the supported capability to the user. In particular, management apparatus 204 may continue using workflow 210 to configure use of the supported capability by the user. Once the supported capability is configured, management apparatus 204 may access the supported capability from electronic device 102 without using printer-specific software 218. For example, management apparatus 204 may use driverless-printing service 214 and/or another driverless service provided by printer 200 to transmit the configuration information (e.g., job options) from workflow 210 to controller 208, and controller 208 may perform a task associated with the configuration information (e.g., printing, scanning, etc.)

Conversely, if the supported capability requires printer-specific software 218, management apparatus 204 may use printer-specific software 218 to provide the supported capability to the user without requiring the user to manually install printer 200. First, management apparatus 204 may download printer-specific software 218 (e.g., from a software update server). For example, management apparatus 204 may expedite installation and use of printer-specific software 218 by downloading printer-specific software 218 using a background process prior to selection 212 of the supported capability by the user (e.g., upon initiating workflow 210). Alternatively, management apparatus 204 may not download printer-specific software 218 until selection 212 of a supported capability that requires printer-specific software 218 is made by the user within workflow 210. During downloading of printer-specific software 218 by workflow 210, management apparatus 204 may notify the user of the download within workflow 210 and provide the user with an option to cancel the download and/or use of the supported capability.

Regardless of the mechanism used to download printer-specific software 218, management apparatus 204 may proceed with installing printer-specific software 218 and resuming workflow 210 after printer-specific software 218 is installed. For example, management apparatus 204 may notify the user of the installation of printer-specific software 218 within workflow 210 and provide the user with the option to cancel the installation and/or use of the supported capability. If the user does not cancel the installation, management apparatus 204 may complete installation of printer-specific software 218 and continue using workflow 210 to configure use of the supported capability by the user. Once configuration of the supported capability is complete, management apparatus 204 may use printer-specific software 218 to communicate with printer 200 and use the supported capability (e.g., scanning, faxing, card reading, etc.) on printer 200.

The system of FIG. 2 may thus expedite and/or streamline use of all supported capabilities 220 on printer 200. In particular, discovery apparatus 202 and/or management apparatus 204 may use driverless capabilities 216 of electronic device 102 and/or printer 200 to provide a subset of supported capabilities 220 to a user of electronic device 102 without downloading, installing, and/or using printer-specific software 218 for printer 200. At the same time, discovery apparatus 202 and/or management apparatus 204 may provide all supported capabilities 220 to the user upon discovering printer 200 and/or driverless-printing service 214 and subsequently introduce use of printer-specific software 218 to enable access to supported capabilities 220 that are not in driverless capabilities 216 in a seamless, automatic manner.

Figure 3:
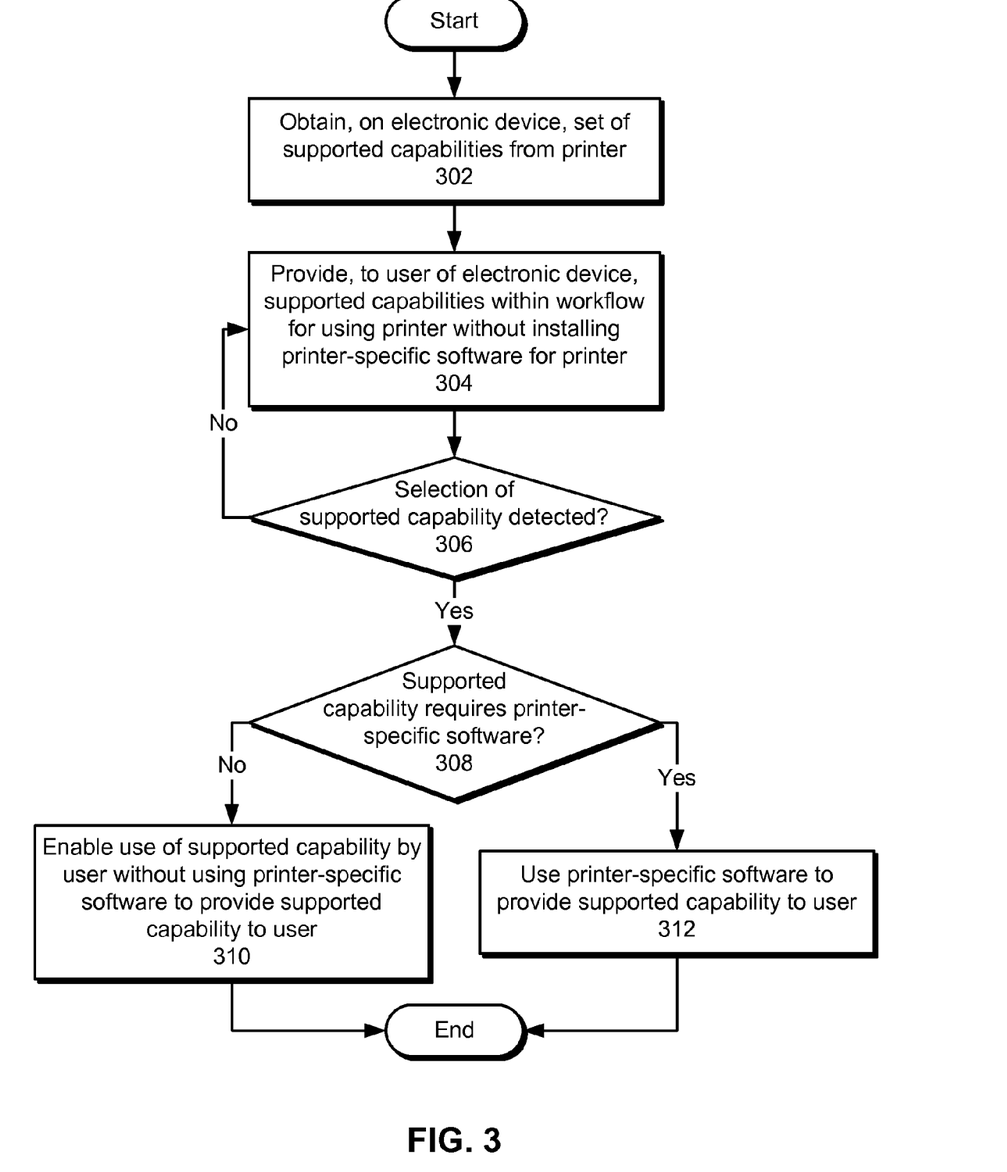
FIG. 3 shows a flowchart illustrating the process of facilitating use of a printer in accordance with the disclosed embodiments.

FIG. 3 shows a flowchart illustrating the process of facilitating use of a printer in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, an electronic device is used to obtain a set of supported capabilities from a printer (operation 302). The supported capabilities may include a printing capability, a scanning capability, a faxing capability, and/or a card-reading capability. In addition, the supported capabilities may be obtained using Bonjour TXT records, IPP attributes, USB attributes, near-field communication (NFC) data, and/or other communication mechanisms associated with the printer.

Next, the supported capabilities are provided to a user of the electronic device within a workflow for using the printer without installing printer-specific software for the printer (operation 304). For example, the printer and the supported capabilities may be displayed to the user within a user interface for the workflow, and selection of the supported capabilities for use by the user may be enabled by the user interface. In other words, the workflow may enable use of the supported capabilities by the user from the electronic device.

Selection of a supported capability from the provided set of supported capabilities by the user may be detected (operation 306). If selection of the supported capability is not detected, the supported capabilities may continue to be provided to the user within the workflow (operation 304) as long as the user remains within the workflow. If selection of the supported capability is detected, the supported capability is examined to determine if the supported capability requires the printer-specific software (operation 308). To determine if the supported capability requires the printer-specific software, a set of driverless capabilities may be obtained from the electronic device. If the set of driverless capabilities includes the supported capability, the supported capability may be identified as not requiring the printer-specific software. If the set of driverless capabilities does not include the supported capability, the supported capability may be identified as requiring the printer-specific software.

If the supported capability does not require the printer-specific software, use of the supported capability by the user is enabled without using the printer-specific software to provide the supported capability to the user (operation 310). For example, the workflow may be used to configure use of the supported capability by the user, and the supported capability may be accessed from the electronic device without using the printer-specific software. Instead, the electronic device may use a driverless-printing service and/or other driverless service (e.g., scanning, faxing, card reading) provided by the electronic device and/or printer to use the supported capability on the printer.

If the software capability requires the printer-specific software, the printer-specific software is used to provide the supported capability to the user (operation 312). The printer-specific software may be downloaded and installed without obtaining additional input from the user, and the workflow for using the printer may be resumed after the printer-specific software is installed. Furthermore, downloading of the printer-specific software may be performed by a background process prior to selection of the supported capability or by the workflow after selection of the supported capability. Once the workflow is complete, the printer-specific software may be used to communicate with the printer and access the supported capability for the user.

Figure 4:
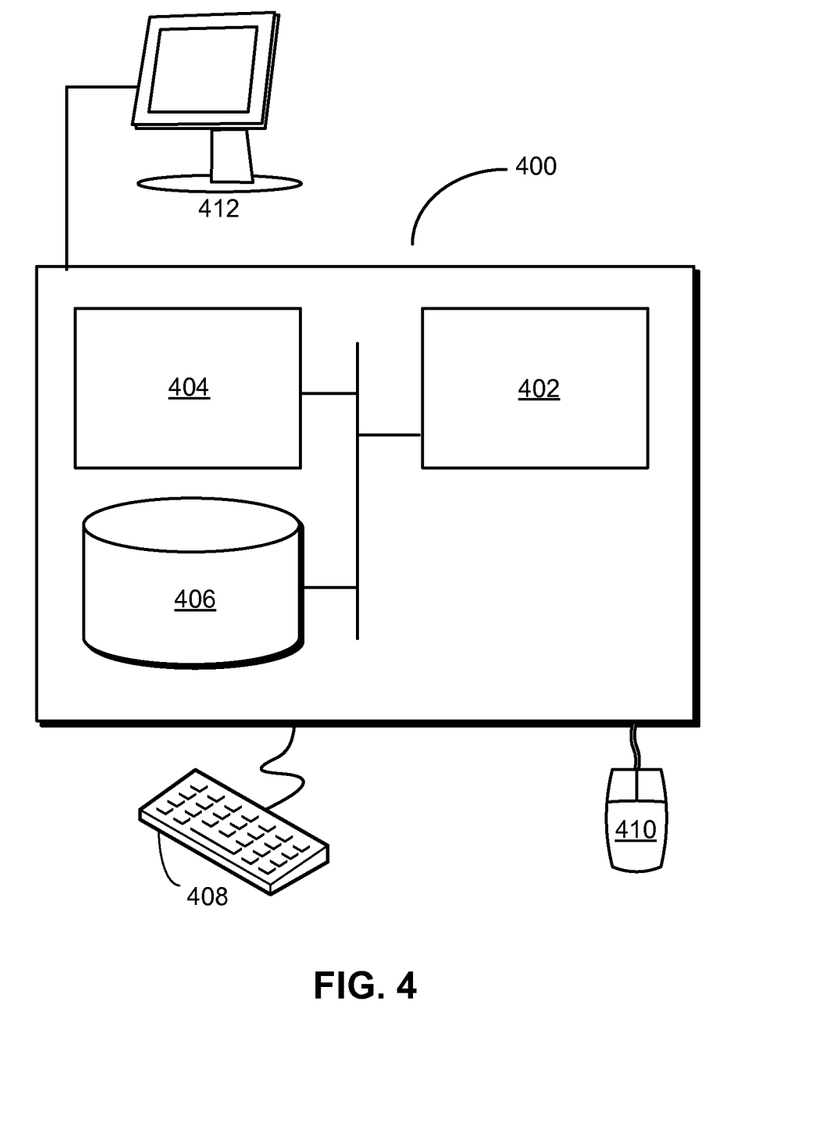
FIG. 4 shows a computer system in accordance with the disclosed embodiments.

FIG. 4 shows a computer system 400 in accordance with the disclosed embodiments. Computer system 400 may correspond to an apparatus that includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for facilitating use of a printer. The system may include a discovery apparatus that obtains a set of supported capabilities from the printer. The system may also include a management apparatus that provides, to a user of the electronic device, the set of supported capabilities within a workflow for using the printer without installing printer-specific software for the printer. Upon detecting a selection of a supported capability from the provided set of supported capabilities by the user, the management apparatus may also determine if the supported capability requires the printer-specific software. If the supported capability does not require the printer-specific software, the management apparatus may enable use of the supported capability by the user without using the printer-specific software to provide the supported capability to the user. Conversely, if the supported capability requires the printer-specific software, the management apparatus may use the printer-specific software to provide the supported capability to the user.

In addition, one or more components of computer system 400 may be remotely located and connected to the other components over a network. Portions of the present embodiments (e.g., discovery apparatus, management apparatus, electronic device, printer, etc.) may also be located on different nodes of a distributed system that implements the embodiments. For example, the present embodiments may be implemented using a number of electronic devices and a number of printers configured to perform printing, scanning, faxing, and/or other tasks for the electronic devices using a driverless-printing service and/or printer-specific software.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating use of a printer, comprising:
    obtaining, on an electronic device, a set of supported capabilities from the printer;
    providing, to a user of the electronic device, the set of supported capabilities within a workflow for using the printer, the providing comprising displaying the printer, supported capabilities that require printer-specific software, and supported capabilities that do not require printer-specific software;
    upon detecting a selection of a supported capability from the provided set of supported capabilities by the user, determining if the supported capability requires printer-specific software;
    if the supported capability does not require printer-specific software, enabling use of the supported capability by the user without using printer-specific software to provide the supported capability to the user; and
    if the supported capability requires printer-specific software, using printer-specific software to provide the supported capability to the user.

2. The computer-implemented method of claim 1, wherein the set of supported capabilities comprises at least one of:
    a printing capability;
    a scanning capability;
    a faxing capability; and
    a card-reading capability.

3. The computer-implemented method of claim 1, wherein a discovery protocol is used to obtain the set of supported capabilities from the printer.

4. The computer-implemented method of claim 1, wherein providing, to the user of the electronic device, the set of supported capabilities within the workflow for using the printer involves:
    enabling selection of the supported capabilities for use by the user.

5. The computer-implemented method of claim 1, wherein determining if the supported capability requires printer-specific software involves:
    obtaining a set of driverless capabilities from the electronic device;
    if the set of driverless capabilities comprises the supported capability, identifying the supported capability as not requiring printer-specific software; and if the set of driverless capabilities does not comprise the supported capability, identifying the supported capability as requiring printer-specific software.

6. The computer-implemented method of claim 1, wherein using the printer-specific software to provide the supported capability to the user involves:
   downloading the printer-specific software;
   installing the printer-specific software on the electronic device; and
   resuming the workflow for using the printer after the printer-specific software is installed.

7. The computer-implemented method of claim 6, wherein the printer-specific software is downloaded using at least one of:
   a background process; and
   the workflow.

8. The computer-implemented method of claim 1, wherein enabling use of the supported capability by the user without using printer-specific software to provide the supported capability to the user involves:
   using the workflow to configure use of the supported capability by the user; and
   accessing the supported capability from the electronic device without using printer-specific software.

9. A system for facilitating use of a printer, comprising:
   a discovery apparatus configured to obtain, on an electronic device, a set of supported capabilities from the printer; and
   a management apparatus configured to:
      provide, to a user of the electronic device, the set of supported capabilities within a workflow for using the printer, the providing comprising displaying the printer, supported capabilities that require printer-specific software, and supported capabilities that do not require printer-specific software;
      upon detecting a selection of a supported capability from the provided set of supported capabilities by the user, determine if the supported capability requires printer-specific software;
      if the supported capability does not require printer-specific software, enable use of the supported capability by the user without using printer-specific software to provide the supported capability to the user; and
      if the supported capability requires printer-specific software, use printer-specific software to provide the supported capability to the user.

10. The system of claim 9, wherein the set of supported capabilities comprises at least one of:
    a printing capability;
    a scanning capability;
    a faxing capability; and
    a card-reading capability.

11. The system of claim 9, wherein a discovery protocol is used to obtain the set of supported capabilities from the printer.

12. The system of claim 9, wherein providing, to the user, the set of supported capabilities within the workflow for using the printer involves:
    enabling selection of the supported capabilities for use by the user.

13. The system of claim 9, wherein determining if the supported capability requires the printer-specific software involves:
    obtaining a set of driverless capabilities from the electronic device;
    if the set of driverless capabilities comprises the supported capability, identifying the supported capability as not requiring printer-specific software; and
    if the set of driverless capabilities does not comprise the supported capability, identifying the supported capability as requiring printer-specific software.

14. The system of claim 9, wherein using the printer-specific software to provide the supported capability to the user involves:
    downloading the printer-specific software;
    installing the printer-specific software on the electronic device; and
    resuming the workflow for using the printer after the printer-specific software is installed.

15. The system of claim 14, wherein the printer-specific software is downloaded using at least one of:
    a background process; and
    the workflow.

16. The system of claim 9, wherein enabling use of the supported capability by the user without using printer-specific software to provide the supported capability to the user involves:
    using the workflow to configure use of the supported capability by the user; and
    accessing the supported capability from the electronic device without using printer-specific software.

17. A non-transitory computer-readable storage medium storing instructions that when executed by a computer cause the computer to perform a method for facilitating use of a printer, the method comprising:
    obtaining, on an electronic device, a set of supported capabilities from the printer;
    providing, to a user of the electronic device, the set of supported capabilities within a workflow for using the printer, the providing comprising displaying the printer, supported capabilities that require printer-specific software, and supported capabilities that do not require printer-specific software;
    upon detecting a selection of a supported capability from the provided set of supported capabilities by the user, determining if the supported capability requires printer-specific software;
    if the supported capability does not require printer-specific software, enabling use of the supported capability by the user without using printer-specific software to provide the supported capability to the user; and
    if the supported capability requires printer-specific software, using printer-specific software to provide the supported capability to the user.

18. The computer-readable storage medium of claim 17, wherein the set of supported capabilities comprises at least one of:
    a printing capability;
    a scanning capability;
    a faxing capability; and
    a card-reading capability.

19. The computer-readable storage medium of claim 17, wherein a discovery protocol is used to obtain the set of supported capabilities from the printer.

20. The computer-readable storage medium of claim 17, wherein providing, to the user of the electronic device, the set of supported capabilities within the workflow for using the printer involves:
    enabling selection of the supported capabilities for use by the user.

21. The computer-readable storage medium of claim 17, wherein determining if the supported capability requires the printer-specific software involves:
- obtaining a set of driverless capabilities from the electronic device;
- if the set of driverless capabilities comprises the supported capability, identifying the supported capability as not requiring printer-specific software; and
- if the set of driverless capabilities does not comprise the supported capability, identifying the supported capability as requiring printer-specific software.

22. The computer-readable storage medium of claim 17, wherein using the printer-specific software to provide the supported capability to the user involves:
- downloading the printer-specific software;
- installing the printer-specific software on the electronic device; and
- resuming the workflow for using the printer after the printer-specific software is installed.

23. The computer-readable storage medium of claim 22, wherein the printer-specific software is downloaded using at least one of:
- a background process; and
- the workflow.

24. The computer-readable storage medium of claim 17, wherein enabling use of the supported capability by the user without using printer-specific software to provide the supported capability to the user involves:
- using the workflow to configure use of the supported capability by the user; and
- accessing the supported capability from the electronic device without using printer-specific software.

* * * * *